Patented Apr. 23, 1935

1,998,750

UNITED STATES PATENT OFFICE 1,998,750

SALICYLIC ACID DERIVATIVE

Herman A. Bruson, Germantown, and Otto Stein, Drexel Hill, Pa., assignors to The Resinous Products & Chemical Co. Inc., Philadelphia, Pa.

No Drawing. Application December 30, 1931, Serial No. 583,920

12 Claims. (Cl. 260—111)

This invention relates to new salicylic acid derivatives and a process for preparing same. These new compounds have the general formula:

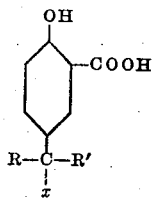

where R and R' are each alkyl groups or jointly an alkylene group and "$x$" is a hydrogen atom or an alkyl group; it being understood that the empirical formula of the radicle

is $C_5H_{11}$, $C_6H_{13}$, $C_6H_{11}$, or $C_7H_{15}$. In other words, these compounds are salicylic acids in which a nuclear hydrogen atom para to the hydroxyl group is replaced by an amyl-, hexyl-, cyclohexyl-, or heptyl-radicle having a branched chain at the carbon atom by which said radicle is connected to the benzene ring.

The object of this invention is to obtain the above compounds for use in medicine by an economical process. They are very powerful antiseptics, fungicides, and disinfectants, as specifically claimed and described in a co-pending patent application U. S. Serial No. 563,362.

According to the present invention, salicylic acid or any ester of salicylic acid is condensed with any nonaromatic monohydric alcohol having from 5 to 7 carbon atoms such as any amyl-, hexyl-, cyclohexyl- or heptyl-alcohol, or isomeric mixtures of these respective alcohols; or with compounds capable of furnishing an amyl-, hexyl-, cyclohexyl- or heptyl- group such as any amylene, hexene, cyclohexene or heptene, or esters such as amyl-, hexyl-, cyclohexyl- or heptyl acetates, propionates, butyrates, benzoates, etc.

As condensing agent, sulphuric acid is used. The new salicylic acid derivative is formed directly and may be isolated by distillation preferably under vacuum. The new compounds thus obtained form colorless viscous liquids or waxy crystals. They are practically insoluble in hot water, in contrast to salicylic acid; but are readily soluble in animal, vegetable, or mineral oils or in lipoid tissue. They are characterized by the fact that their metal salts such as the mono-zinc, bismuth, lead, cobalt, manganese, etc. dissolve readily in organic solvents such as acetone, ethyl acetate, benzol, and in natural fats and oils such as linseed, tung, perilla, and the like, as more specifically described in part and claimed in a co-pending patent application bearing U. S. Serial No. 551,802, now Patent No. 1,933,520, Oct. 31, 1933.

In carrying out the present invention, it has been found preferable to use as condensing agent, aqueous sulphuric acid having a specific gravity of between 55° and 63° Baumé, since the yields obtained are higher than those from a more concentrated sulphuric acid. The temperature preferably used is between 70° and 85° centigrade, although these conditions are by no means a limitation to the process.

Example 1

*Para-secondary amylsalicylic acid.*—To 1400 grams of 80% sulphuric acid at 75° C., a mixture of 140 grams normal amyl alcohol or of secondary amyl alcohol and 100 grams salicylic acid is added, and the mixture stirred vigorously under a reflux condenser for 10 hours at 75–85° C. The mixture is then allowed to cool, and is diluted with an equal volume of cold water. The dark oil which separates is removed and washed several times with hot water to remove traces of unchanged salicylic acid. The oil represents a mixture of para-sec-amylsalicylic acid with varying small amounts of amylsalicylate and amylsalicylic ether. It may be distilled in vacuo to yield an oily mixture of these compounds which may be employed directly as a fungicide. Or the black oil may be dissolved in sodium bicarbonate solution and any insoluble matter removed by filtration or by shaking up with an organic solvent such as ether, toluene, or ethylene dichloride which is immiscible with water. This removes the neutral by-products of the reaction. The alkaline layer is then acidified with dilute mineral acid (sulphuric or hydrochloric acid) whereupon crude p-sec-amyl-salicylic acid is precipitated as a brown oil. The latter is taken up in ether, dried over anhydrous sodium sulfate and distilled in vacuo. The compound distills at about 158° C. under 4 m. m. pressure as an almost colorless oil.

Example 2

*Para-tertiary-amylsalicylic acid.*—Instead of using 140 grams normal or sec-amyl alcohol as described in Example 1, an equal weight of di-methyl-ethyl-carbinol is used under the same conditions. The product boiled at 173–177° C. under 8 m. m. pressure forming a colorless oil which partially crystallized upon standing for several days. Yield 90 grams. The crystalline material after several recrystallizations from ligroin melted at 124° C.

Example 3

*Para-sec-iso-amylsalicylic acid.*—Following the procedure set forth in Example 1, 140 grams of iso-amyl alcohol were condensed with 100 grams salicylic acid in the presence of 1400 grams 75% sulphuric acid, for 10 hours at 70–75° C. The product obtained after working up as described in Example 1 boiled at 165–168° C. under 3 m. m. pressure. Yield 75–90 grams. It formed a colorless oil which crystallized on long standing and melted at 133° C. after recrystallization from ligroin.

In a similar manner, salicylic acid may be condensed with methyl-propyl carbinol or diethyl carbinol to yield amylsalicylic acids, both of which form waxy crystals insoluble in water.

Example 4

*Mixed isomeric amylsalicylic acids.*—To 1400 grams of 77% sulphuric acid at 75° C. there was added a mixture of 100 grams salicylic acid and 140 grams of a mixture of isomeric amyl alcohols known as "Pentasol" (a registered trade-mark); the latter being obtained by hydrolysis from the chlorination products of the pentanes of natural gas and characterized by consisting mainly of the five mixed isomeric amyl alcohols with the exception of ter-amyl alcohol. After heating 10–13 hours at 75–80° C. the reaction product when worked up as described in Example 1 yielded a mixture of isomeric amyl salicylic acids boiling at 180–195° C. under 15 m. m. pressure. It forms a pale yellow, viscous oil.

Example 5

*Para-sec-hexylsalicylic acid.*—From 1400 grams 80% sulphuric acid, 100 grams salicylic acid and 163 grams sec-hexyl alcohol (B. P. 136–139° C. as fractionated from commercial sec-hexanol) there was obtained after heating for 14 hours at 70° C. as described in Example 1, a pale yellow oil boiling at 172–177° C. under 6 m. m. pressure, which crystallized to a waxy mass M. P. 104–106° C. (from ligroin).

A hexylsalicylic acid has already been prepared by E. H. Cox, Jour. Am. Chem. Soc. 52, 357 (1930), by reduction of hexylylsalicylic acid or isohexylylsalicylic acid with amalgamated zinc, and a similar hexylsalicylic acid has been described in Swiss Pat. 127,649 (1928), as being made by the action of carbon dioxide on n-hexylphenol. Our compound differs from these in having a branched chain hexyl group at the carbon atom by which the hexyl group is connected to the benzene ring.

Example 6

*Para-cyclohexylsalicylic acid.*—To 1400 grams 80% $H_2SO_4$ a mixture of 100 grams salicylic acid and 145 grams cyclohexanol were added and the mixture heated for 10 hours at 75° C. with vigorous agitation. After diluting with water, a black resinous mass was precipitated. It was taken up in sodium bicarbonate solution, filtered, and the filtrate acidified. The crude cyclohexylsalicylic acid thus obtained is purified by recrystallization from ligroin. It formed colorless needles melting at 102–103° C.

Example 7

*Para-sec-heptylsalicylic acid.*—To 280 grams 80% $H_2SO_4$ a mixture of 20 grams salicylic acid and 36 grams normal or sec-heptyl alcohol is added and the mixture heated 10 hours at 70–75° C. with vigorous stirring. After pouring into water and working up as set forth in Example 1 a colorless oil boiling at 180–190° C. under 7 m. m. was obtained.

Example 8

Into 1400 grams of 80% sulphuric acid at 70° C. a mixture of 210 grams commercial iso-amyl acetate and 100 grams salicylic acid is run and the mixture stirred continuously for 10 hours at 70–75° C. under reflux. Upon working up the product as described in Example 1 it was found that 51–60 grams of para-sec-iso-amylsalicylic acid boiling at 175–190° C. under 17 m. m. were obtained.

Similarly by using the equivalent amount of any hexyl- cyclohexyl- or heptyl acetates or other esters, in the above condensation the para-substituted hexyl-, cyclohexyl-, or heptyl salicylic acids may be obtained respectively. Thus one may use propionates, butyrates, benzoates, or other esters of amyl-, hexyl-, cyclohexyl- and heptyl alcohols.

Example 9

By heating a mixture of 1400 grams sulphuric acid, 90 grams ethyl salicylate (or the equivalent amount of any similar ester of salicylic acid such as methyl, propyl, butyl, amyl, etc.) and 55 grams ter-amyl alcohol for 7 hours at 70° C., there is obtained directly in good yield, p-ter-amylsalicylic acid, boiling at 180–195° C. under 25 m. m.

Example 10

By heating 1400 grams of 80% $H_2SO_4$ at 60° C. for 8 hours with a mixture of 100 grams salicylic acid and 125 grams commercial amylene (boiling at 20–40° C. and consisting principally of 2-pentene) under reflux, and then heating further for 2 hours at 75° C. with constant stirring, there was obtained after working up as in Example 1, a very good yield of a mixture of para-amyl-salicylic acids boiling between 190° C. and 200° C. under 24 m. m. The mixture formed a colorless viscous oil which partially crystallized.

In a similar manner, hexene, cyclohexene or heptene condenses readily with salicylic acid to yield hexyl-, cyclohexyl-, or heptyl salicylic acids respectively.

In all of the above examples the quantity of the alkylating agent employed is preferably at least 2 mole equivalents per mole of salicylic acid and the quantity of sulphuric acid used is preferably in excess of that required to combine with the alkylating agent.

The crude acids obtained by the above process usually contain small amounts of alkyl ethers of salicylic acid which depress their melting points. The pure compounds may be obtained by esterifying the crude acids with methyl- or ethyl alcohol according to well known methods, fractionating the mixture of esters formed and subsequently saponifying the higher boiling fraction with caustic alkali. For use as fungicides, however, it is not necessary to have the acids absolutely pure, as the corresponding amyl-, hexyl-, cyclohexyl-, and heptyl- ethers of salicylic acid which are the main impurities are also fungicidal in their action.

The use of alcohols higher than heptyl in this condensation leads to higher alkylated salicylic acids as described and claimed separately in co-pending U. S. Patent application Serial No. 566,314.

What we claim therefore is:

1. A derivative of salicylic acid having the general formula

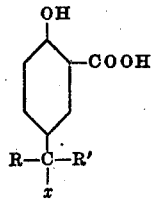

where R and R' are each alkyl groups or jointly an alkylene group and "$x$" is a hydrogen atom or alkyl group; the empirical formula of the

radical being one of the group consisting of
$C_5H_{11}$, $C_6H_{13}$, $C_6H_{11}$, $C_7H_{15}$ 2. A salicylic acid in which a nuclear hydrogen atom para to the hydroxyl group is replaced by an amyl group having a branched chain at the carbon atom by which it is connected to the benzene ring.

3. A salicylic acid in which a nuclear hydrogen atom para to the hydroxyl group is replaced by a hexyl group having a branched chain at the carbon atom by which it is connected to the benzene ring.

4. A salicylic acid in which a nuclear hydrogen atom para to the hydroxyl group is replaced by a heptyl group having a branched chain at the carbon atom by which it is connected to the benzene ring.

5. 2-Hydroxy-5-sec-amyl-benzoic acid.

6. 2-Hydroxy-5-sec-hexyl-benzoic acid.

7. A process for preparing a derivative of salicylic acid having the general formula

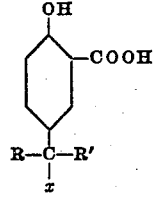

where R and R' are each alkyl groups or jointly an alkylene group, and "$x$" is a hydrogen atom or alkyl group; the empirical formula of the

radicle being one of the group consisting of
$C_5H_{11}$, $C_6H_{13}$, $C_6H_{11}$, $C_7H_{15}$ which comprises heating at reaction temperature a member of the group consisting of salicylic acid and salicylic acid esters in which only the carboxyl group of the salicylic acid is esterified, with a member of the group consisting of a non-aromatic alcohol having from 5 to 7 carbon atoms inclusive, a monocarboxylic acid ester of such an alcohol, and a non-aromatic unsaturated hydrocarbon containing not more than one double bond and having from 5 to 7 carbon atoms inclusive, in the presence of sulphuric acid as a condensing agent.

8. In the process for preparing a nuclear substitution product of salicylic acid, the step which consists in heating at reaction temperature a member of the group consisting of amyl alcohol, hexyl alcohol, cyclohexanol and heptyl alcohol with reacting proportions of salicylic acid in the presence of aqueous sulphuric acid having a density of between 55° and 63° Bé., as a condensing agent at a temperature of substantially 70–85° centigrade.

9. In the process for preparing a nuclear substitution product of salicylic acid, the step which consists in heating a mixture of salicylic acid with at least two mole equivalents of a nonaromatic alcohol containing from 5 to 7 carbon atoms inclusive, in the presence of sulphuric acid of about 55–63° Bé. density as condensing agent, said condensing agent being used in an amount in excess of the quantity required to combine with the alkylating agent.

10. A compound having the formula

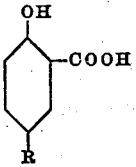

in which R is a tertiary alkyl hydrocarbon group containing from five to seven carbon atoms inclusive.

11. A process which consists in heating salicylic acid with at least one molecular equivalent of an olefine having from five to seven carbon atoms inclusive, in the presence of sulfuric acid and separating a nuclear alkylated derivative of salicylic acid from the reaction product.

12. A process which consists in heating salicylic acid with amylene in the presence of sulfuric acid and separating amylsalicylic acid from the reaction mixture.

HERMAN A. BRUSON.
OTTO STEIN.